United States Patent [19]
Hofmeister et al.

[11] 3,714,207
[45] Jan. 30, 1973

[54] 1α, 2α; 6β, 7β-DIMETHYLENE STERIODS

[75] Inventors: Helmut Hofmeister; Hermann Steinbeck; Rudolf Wiechert, all of Berlin, Germany

[73] Assignee: Schering Aktiengesellschaft, Berlin, Germany

[22] Filed: May 1, 1970

[21] Appl. No.: 33,961

[30] Foreign Application Priority Data

May 2, 1969 Germany.................P 19 23 378.4

[52] U.S. Cl.....260/397.4, 260/239.5, 260/239.55 R, 260/999
[51] Int. Cl............................................C07c 169/34
[58] Field of Search ......./Machine Searched Steroids

[56] References Cited
UNITED STATES PATENTS 3,365,446  1/1968  Cross et al......................260/239.55
3,485,853  12/1969  Cross et al..........................260/397.4
3,549,671  12/1970  Laurent et al.......................260/397.4

*Primary Examiner*—Henry A. French
*Attorney*—Millen, Raptes & White

[57] ABSTRACT

1α,2α;6β,7β-Dimethylene-17α-oxy-progesterones of the formula

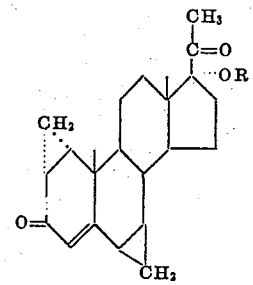

wherein R is H or an acyl radical, have progestational activity without ovulation inhibiting activity.

6 Claims, No Drawings

1α, 2α; 6β, 7β-DIMETHYLENE STERIODS

BACKGROUND OF THE INVENTION

This invention relates to novel 1α,2α;6β,7β-dimethylene steroids, to a process for their production and their use as progestational agents.

SUMMARY OF THE INVENTION

This invention is directed to 1α,2α;6β,7β-dimethylene-17α-hydroxy-progesterone, its 17 esters, to their production and to their use as progestational agents.

DETAILED DISCUSSION

1α,2α;6β,7β-Dimethylene-17α-hydroxy-progesterone and its 17-esters can be represented by the formula

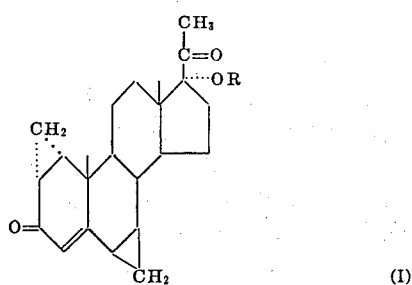

(I)

wherein R is a hydrogen atom or an acid residue.

Suitable acid residues R are preferably those of physiologically acceptable acids. Preferred acids are organic carboxylic acids containing up to 15 carbon atoms, most preferably fatty acids of 1 to 8 carbon atoms. The acids can be saturated or unsaturated, straight chain or branched, mono-, di- or polybasic, or substituted, e.g., with one or more hydroxy, oxo or amino groups, and/or halogen atoms. Also suitable are cycloaliphatic, aromatic, mixed aromatic-aliphatic, or heterocyclic acids which can likewise be substituted in a suitable manner.

Specific examples of compounds of this invention wherein R is the acyl radical of formic acid, acetic acid, propionic acid, butyric acid, valeric acid, caproic acid, enanthic acid, undecylic acid, trimethylacetic acid, diethylacetic acid, tert.-butylacetic acid, phenylacetic acid, cyclopentylpropionic acid, oleic acid, lactic acid, mono-, di-, and trichloroacetic acid, aminoacetic acid, diethylamino-, piperidino-, and morpholinoacetic acid, succinic acid, adipic acid, benzoic acid, nicotinic acid, etc. Also suitable are those wherein R is the acid residue of an inorganic acid, such as, for example, sulfuric and phosphoric acid.

Although the esterified compounds of this invention are preferably those of Formula I in which the 17α-oxy group is an ester of an acyloxy acid, e.g., lower-alkanoyloxy, also included are those which are esters of acyloxy acids of, for example, an aryl or alkaryl acid, e.g., benzoic, 2,3 or 4-methylbenzoic, 2,3-, 2,4-, 2,5-, 2,6-, 3,4- and 3,5-diemthylbenzoic, ethylbenzoic, 2,4,6-trimethylbenzoic, 2,4,6-triethylbenzoic, α-naphthoic, 3-methyl-α-naphthoic, an aromatic hydroxyacid, e.g., salicylic acid, an aromatic aminoacid, e.g., para-aminosalicylic, para-aminobenzoic, other aromatic hetero-substituted acids, e.g., 2,3,4-trimethoxybenzoic, carbamic acids, e.g., carbamic acid, phenylcarbamic, n-butylcarbamic, dimethylcarbamic, diethylcarbamic, allophanic, or a heterocyclic acid, e.g., β-furyl-carboxylic, N-methylpyrrolidyl-2-carboxylic, α-picolinic, indole-2-carboxylic, 6-hydroxy-indolyl-3-acetic, N-methylmorpholyl-2-carboxylic lysergic, pyrrolyl-2-carboxylic, or other acyl acid.

As stated above, also included as compounds of this invention are those wherein R is an esterified hydroxy group in which the ester is an ester of an inorganic acid, e.g., sulfuric and phosphoric acid, both in free acid form and as salts of alkali and alkaline earth metals, e.g., Na and Ca.

Although the process of this invention is directed to the production of the compounds of Formula I, it will be apparent the process can be used for the production of 1α,2α,6β,7β-dimethylene-Δ⁴-3-keto steroids generally, from the corresponding 4-chloro compounds, e.g., those having a β-hydroxy, -keto, β-acetyl, β-hydroxyacetyl, β-hydroxyacetyl-α-hydroxy, α-ethynyl-17β-hydroxy-α-methyl-17β-hydroxy, etc., group at the 17-position.

The invention relates further to a process for the preparation of compounds of Formula I wherein 4-chloro-steroid of the formula

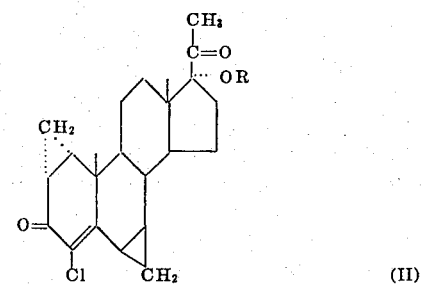

(II)

wherein R has the values given above, is treated with hydriodic or hydrobromic acid, preferably in the presence of a lower-aliphatic carboxylic acid. Surprisingly, the hydrohalic acid causes the chlorine atom to be eliminated from the 4-position of compounds of general Formula II to produce the corresponding 4-deschloro-7β-halomethyl- and 4-deschloro-1α,7β-bishalomethyl-compounds. To reform the cyclopropane rings in the 6,7-, or 1,2- and 6,7-position, the 4-deschloro-7β-halomethyl and 4-deschloro-1α,7β-bishalomethyl compounds, which have, respectively, the following formula:

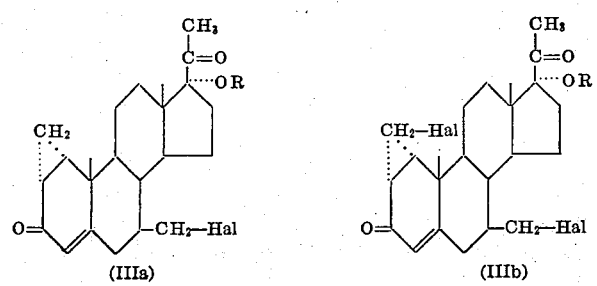

(IIIa)    (IIIb)

wherein R has the value given above and —Hal is Br or I, are treated separately or as a mixture with a base, to produce the corresponding compound of Formula I. Thereafter, if the 17-oxy group is a free 17-hydroxy group, it can be esterified or, if the 17-oxy group is an esterified 17-hydroxy group, it can be saponified to the free hydroxy compound.

The hydrohalic acid can be caused to react with the starting steroid (II) by adding the acid to the dissolved steroid and heating the reaction solution, preferably at the boiling point of the reaction mixture. Suitable solvents are those which are inert with respect to both the steroid and the hydrohalic acid. Inert solvents are, for example, ethers, e.g., tetrahydrofuran and dioxane, hydrocarbons, e.g., hexane and benzene, chlorinated hydrocarbons, e.g., methylene chloride and chloroform, and, in particular, lower aliphatic carboxylic acids, e.g., formic acid and acetic acid. In a preferred embodiment, the hydrohalic acid HX is liberated during the reaction from an alkali salt thereof with a lower-carboxylic acid, which also serves as the reaction solvent.

In order to obtain a complete elimination of the chlorine atom in the 4-position, the solution must be heated above room temperature, e.g., under reflux conditions, for several hours. Under these conditions, a further reaction simultaneously occurs, viz., the $6\beta,7\beta$-methylene group is split, with the formation of the $7\beta$-halomethyl compound (IIIa). The $1\alpha,2\alpha$-methylene group is likewise at least partially cleaved to also produce the corresponding $1\alpha,7\beta$-bishalomethyl compound (IIIb).

In order to form the methylene group in the 6,7-position and in the 6,7- and 1,2-positions, respectively, the reaction products (IIIa, IIIb) are subsequently treated with a base strong enough to dehydrohalogenate these halomethylene compounds. Suitable bases are inorganic bases, e.g., sodium, hydroxide, potassium hydroxide, potassium carbonate, calcium oxide and aluminum oxide, as well as organic bases known to act as dehydrohalogenating agents, e.g., a heterocyclic aromatic amine, collidine, lutidine, pyridine, etc.

When a strong base, e.g., sodium or potassium hydroxide, is employed, the splitting off of hydrogen halide can advantageously be conducted in an alcoholic solution, e.g., at room temperature or with heating. When the compound being dehydrohalogenated is esterified in the 17-position, a simultaneous saponification of the 17-ester can occur. The desired ring closure to the $1\alpha,2\alpha;6\beta,7\beta$-dimethylene can also be conducted by agitating the 7-halomethyl (IIIa) or 1,7-bishalomethyl compound (IIIb), dissolved in an organic solvent, for several hours with a weak base, e.g., aluminum oxide. Under these conditions, a 17-ester group is not attacked.

The subsequent esterification of the $17\alpha$-hydroxy group of the reaction product (I, R=H) can be conducted under conditions conventionally employed for the esterification of $17\alpha$-hydroxy-progesterone, e.g., by reaction with a reactive acid derivative of the selected acid in the presence of a basic esterification agent. Examples of such reactive acid derivatives are acid anhydrides or halogenides. Examples of basic agents are pyridine, collidine, lutidine, etc. The esterification is preferably conducted with heating.

In order to produce water-soluble esters, the 17-hydroxy product is esterified to an acid addition salt of a $17\alpha$-aminoacylate ester thereof, e.g., dimethylamino, diethylamino-, piperidino-, and morpholine-acetates, and into alkali-metal salts of dicarboxylic acid monoesters, e.g., succinate, sulfuric acid esters, and phosphoric acid esters thereof. The method of preparation of such soluble esters is well known in the art.

$1\alpha,2\alpha;6\beta,7\beta$-Dimethylene-$\Delta^4$-3-ketosteroids unsubstituted in the 4-position have not been described heretofore. They cannot be obtained from the corresponding $\Delta^{1,4,6}$-3-ketosteroids, because methylating agents react only with the $\Delta^1$-double bond of such compounds to produce 1,2-methylene-$\Delta^{4,6}$-3-ketosteroids.

The novel dimethylene steroids of Formula I possess gestagenic activity comparable to that of the corresponding 4-chloro compounds. However, in contrast to the corresponding 4-chloro compounds, they do not effect an inhibition of ovulation, even at high dosages. Because of this marked dissociation of gestagenic and ovulation-inhibiting activities, the compounds of this invention (I) can be advantageously employed for the treatment of gynecologic disturbances where contraception is not desired, e.g., primary amenorrhea and secondary amenorrhea of long duration, cycle disturbances due to insufficient corpus leteum function, endometriosis, hypoplasia of the uterus, premenstrual discomforts, mastopathia, etc. The dosage is determined in part by the seriousness of the disease. In general, the daily dose is between 1 and 100 mg.

The compounds of Formula I possess progestational activity. For use as progestational agents, they can be formulated into conventional drug forms with the additives, carrier substances, and flavoring agents customary in pharmaceutical preparations which do not deleteriously react with the effective agents, employing conventional methods. For oral application, particularly suitable are tablets, dragees, capsules, pills, suspensions and solutions. Such compositions can employ, for example, water, alcohol, polyethylene glycols, gelatin, sucrose, lactose, amylose in solutions and suspensions and magnesium stearate, talc, starch, sugars, etc., in tablets.

Particularly preferred are pharmaceutical preparations containing a compound of this invention adapted for oral administration, especially those conventionally employed in the treatment of gynecological disturbances.

The concentration of the compound of this invention (I) in the thus-formulated drugs is also dependent on the form of application. Solid formulations for oral administration, e.g., tablets and dragees, preferably contain 0.1 to 10 mg. of effective agent per unit. Solutions for parenteral application preferably contain 1 to 20 mg. per 1 ml. of solution.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

10 g. of 4-chloro-17-acetoxy-$1\alpha,2\alpha;6\beta,7\beta$-dimethylene-4-pregnene-3,20-dione is heated under reflux with 35 g. of potassium iodide in 100 ml. of concentrated formic acid for 18 hours with the introduction of nitrogen. The solution is then stirred into acetic acid-ice water. The precipitate is vacuum-filtered, taken up in methylene chloride, and the solution is washed successively with dilute sodium thiosulfate solution and water. The crude product is chromatographed on silica gel, thus obtaining with 2.5 – 3 percent of acetone-methylene chloride, 1.0 g. of 17-acetoxy-1α,7β-bisiodomethyl-4-pregnene-3,20-dione, m.p. 194-195° C. (with decomposition). UV: $\epsilon_{246} = 15,600$.

With 6-8 percent of acetone-methylene chloride, 2.7 g. of 17-acetoxy-7β-iodomethyl-1α,2α-methylene-4-pregnene-3,20-dione is eluted, m.p. 225°-227° C. (under decomposition). UV: $\epsilon_{241} = 16,100$.

a. 700 mg. of 17-acetoxy-7β-iodomethyl-1α,2α-methylene-4-pregnene-3,20-dione is stirred in 25 ml. of benzene with 12 g. of basic aluminum oxide for 12 hours. Then, the solution is decanted, and the aluminum oxide is washed out several times with acetone. After the solvent has been distilled off, 330 mg. of 17-acetoxy-1α,2α;6β,7β-dimethylene-4-pregnene-3,20-dione is obtained, m.p. 263.5° – 265.5° C. (acetone-hexane). UV: $\epsilon_{260} = 15,500$.

b. 850 mg. of 17-acetoxy-1α,7β-bis-iodomethyl-4-pregnene-3,20-dione is stirred in 30 ml. of benzene with 12 g. of basic aluminum oxide, and worked up as set forth above. After recrystallization from acetone-hexane, 250 mg. of 17-acetoxy-1α,2α;6β,7β-dimethylene-4-pregnene-3,20-dione is obtained, m.p. 261°-263° C.

The two prepurified iodomethyl compounds (a) and (b) can also be reacted in the form of a mixture with benzene in basic aluminum oxide to obtain 17-acetoxy-1α,2α;6β,7β-dimethylene-4-pregnene-3,20-dione.

EXAMPLE 2

17 g. of 4-chloro-17-acetoxy-1α,2α;6β,7β-dimethylene-4-pregnene-3,20-dione is heated under reflux in 325 ml. of concentrated formic acid with 65 g. of potassium iodide for 3 days, with the introduction of nitrogen. Then, the dark-colored solution is stirred into acetic ice water, the precipitate is vacuum-filtered, and taken up in methylene chloride. The solution is successively washed with dilute sodium thiosulfate solution and water. The thus-obtained crude product, 17-acetoxy-7β-iodo-methyl-1α,2α-methylene-4-pregnene-3,20-dione is stirred, for purposes of cyclization and saponification, in a mixture of 190 ml. of methylene chloride and 650 ml. of methanol with 290 ml. of 1N NaOH solution for 17 hours at room temperature. Thereafter, the solution is substantially concentrated under a vacuum, and the product is precipitated in ice water. The precipitate is vacuum-filtered, dried, and chromatographed on silica gel with 33-39 percent acetone/pentane, thus obtaining 2 g. of 17-hydroxy-1α,2α;6bs,7β-dimethylene-4-pregnene-3,20-dione, m.p. 250°-252° C. (acetone/hexane). UV: $\epsilon_{261} = 15,400$.

EXAMPLE 3

1.7 g. of 17-hydroxy-1α,2α;6β,7β-dimethylene-4-pregnene-3,20-dione is heated under reflux in 20 ml. of pyridine with 10 ml. of acetic acid anhydride for 5 days with the introduction of nitrogen. The solution is then stirred into sulfuric acid-ice water, the precipitate is vacuum-filtered and washed several times with water. After conducting a chromatography on silica gel with 13-20 percent acetone/pentane and recrystallization, 400 mg. of 17-acetoxy-1α,2α;6β,7β-dimethylene-4-pregnene-3,20-dione is obtained, m.p. 264°-265° C. (acetone/hexane).

EXAMPLE 4

500 m.g. of 17-hydroxy-1α,2α;6β,7β-dimethylene-4-pregnene-3,20-dione is heated under reflux with 1 ml. of propionic acid anhydride in 2 ml. of pyridine for 3 days. Then the solution is poured into sulfuric acid-ice water, and the reaction product is extracted with methylene chloride. After chromatography on silica gel with 21-25 percent acetone/pentane and recrystallization, 170 mg. of 17-propionyloxy-1α,2α;6β,7β-dimethylene-4-pregnene-3,20-dione is obtained, m.p. 220°-223° C. (acetone/hexane). UV: $\epsilon_{260} = 15,500$.

EXAMPLE 5

800 mg. of 17-hydroxy-1α,2α;6β,7β-dimethylene-4-pregnene-3,20-dione is heated under reflux, as described in Example 1, with 3 ml. of butyric acid anhydride in 8 ml. of pyridine for 5 days. After steam distillation, extraction of the product with methylene chloride, and chromatography on silica gel with 20-27 percent acetone/pentane, 800 mg. of 17-butyryloxy-1α,2α;6β,7β-dimethylene-4-pregnene-3,20-dione is obtained in the form of a foam. UV: $\epsilon_{260} = 14,000$.

EXAMPLE 6

500 mg. of 17-hydroxy-1α,2α;6β,7β-dimethylene-4-pregnene-3,20-dione is heated under reflux with 2 ml. of caproic acid anhydride in 4 ml. of pyridine for 3 days. After working up by means of ice water precipitation, extraction with methylene chloride, and chromatography on silica gel with 18-21 percent acetone/hexane, 120 mg. of 17-hexanoyloxy-1α,2α;6β,7βb-dimethylene-4-pregnene-3,20-dione is obtained in the form of an oil. UV: $\epsilon_{260} = 15,100$.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a compound which comprises the steps of
   a. reacting 4-chloro- with hydriodic or hydrobromic acid; and
   b. reacting the thus-produced 4-deschloro product with a dehydrohalogenating base.

2. A process according to claim 1 wherein the starting 4-chloro steroid is the 17-acetate.

3. A process according to claim 1 wherein the dehydrohalogenating base is aluminum oxide.

4. A process according to claim 1 wherein the starting 4-chloro steroid is reacted with hydrogen iodide.

5. A process according to claim 1 wherein step (a) is conducted in the presence of a lower-aliphatic acid.

6. A process according to claim 5 wherein the lower-aliphatic acid is formic acid.

* * * * *

UNITED STATES PATENT OFFICE
CERTIFICATE OF CORRECTION

Patent No. 3,714,207                    Dated January 30, 1973

Inventor(s) Helmut Hofmeister, et al.

It is certified that error appears in the above-identified patent and that said Letters Patent are hereby corrected as shown below:

COLUMN 5, LINE 48, EXAMPLE 2: "1α,2α;6½s" should read -- 1α,2α,6β --.

COLUMN 6, LINE 31, EXAMPLE 6: "6β,7βb" should read -- 6β,7β --.

COLUMN 6, CLAIM 1, LINE 44: "A process for the production of a compound" should read -- A process for the production of 1α,2α,6β,7β-dimethylene-17α-hydroxy progesterone and 17-esters thereof --.

Signed and sealed this 27th day of November 1973.

(SEAL)
Attest:

EDWARD M. FLETCHER, JR.              RENE D. TEGTMEYER
Attesting Officer                    Acting Commissioner of Patents